United States Patent
Ogawa

[11] Patent Number: 5,276,563
[45] Date of Patent: Jan. 4, 1994

[54] ZOOM LENS CAMERA

[75] Inventor: Kimiaki Ogawa, Tokyo, Japan

[73] Assignee: Asahi Kogaku Kogyo Kabushiki Kaisha, Tokyo, Japan

[21] Appl. No.: 533,779

[22] Filed: Jun. 6, 1990

[30] Foreign Application Priority Data

Jun. 9, 1989 [JP] Japan .................. 1-148103

[51] Int. Cl.⁵ .......................... H04N 5/78; H04N 5/232
[52] U.S. Cl. ...................... 360/35.1; 358/906; 358/225; 358/227; 358/342
[58] Field of Search ................ 360/11.1, 35.1, 14.1-; 358/906, 909, 335, 342, 225, 227; 318/195.1

[56] References Cited

U.S. PATENT DOCUMENTS

| | | | |
|---|---|---|---|
| 4,442,462 | 4/1984 | Kimura | 360/33.1 |
| 4,553,170 | 11/1985 | Aoki et al. | 358/906 |
| 4,788,603 | 11/1988 | Fujimura et al. | 358/342 |
| 4,936,664 | 6/1990 | Haraguchi et al. | 350/429 |
| 4,944,030 | 7/1990 | Haraguchi et al. | 354/403 |

FOREIGN PATENT DOCUMENTS 58-103273  6/1983  Japan .
8707036  11/1987  World Int. Prop. O. .
8707038  11/1987  World Int. Prop. O. .

*Primary Examiner*—Aristotelis Psitos
*Assistant Examiner*—Varsha V. Sheladia
*Attorney, Agent, or Firm*—Sandler Greenblum & Bernstein

[57] ABSTRACT

A zoom lens camera records an image to be photographed. A zoom switch is operated to drive a zoom lens of the camera. The zoom lens is driven in response to the operation of the zoom switch, and is controlled so that the zoom lens and the image recorder are alternately activated when the operation of the zoom lens and the operation of the image recorder are simultaneously instructed.

20 Claims, 3 Drawing Sheets

ZOOM LENS CAMERA

BACKGROUND OF THE INVENTION

1. Field of the Invention

The present invention relates to a zoom lens camera having a power zoom function.

2. Description of Related Art

Electronic still cameras (i.e., still video cameras), have becomes available in recent years. In these cameras, the image of one frame (one field) is recorded on one track of a magnetic disk. Accordingly, the magnetic disk is controlled so that it makes one revolution at the period of one field (i.e., 1/60 sec. according to NTSC).

Since the magnetic disk, which serves as a recording medium, is rotated at such a high speed, a large number of frames can be photograph in quick succession (i.e., continuous shooting mode), such as, 1, 2 or 5 frames per second, for a desired period of time.

By combining this continuous shooting mode with zooming, a series of images, which is gradually enlarged or reduced, can be photographed.

However, the conventional electronic still cameras suffer from the problem that when the continuous shooting mode and zooming are to be simultaneously executed, as described above, a series of recording operation is carried out while the zoom lens is being moved, and consequently, associated elements, such as an imaging circuit, recording circuit, aperture motor, tracking motor, spindle motor, etc., are simultaneously activated, resulting in an increase in the peak current consumed.

Accordingly, the load on the power supply circuit increases and the rated capacity thereof must be increased, which results in an increase in the over-all size of the camera and a rise in the cost of manufacture.

SUMMARY OF THE INVENTION

In view of these circumstances, it is an object of the present invention to enable the zooming mode and the continuous photographing (shooting) mode to be simultaneously executed without increasing the overall size and cost of the camera.

The zoom camera of the present invention comprises a device for recording a photographed image on a recording medium, a zoom switch which is operated to drive a zoom lens; a drive mechanism for driving the zoom lens in response to the operation of the zoom switch and a controller for controlling, when two instructions are simultaneously given to drive the zoom lens and effect recording with the recording device, the zoom driving mechanism and the recording device such that the zoom lens and the recording device are alternately activated.

In the zoom camera having the above-described arrangement, when the continuous shooting (photographing) mode, for example, is set, a series of frames is shot at a rate of a predetermined number of frames per second, as long as the release switch is turned ON, and the photographed images are successively recorded on a recording medium, such as, a magnetic disk.

If the zoom switch, which comprises, for example, a TELE or WIDE switch, is ON during this photographing operation, the zoom lens is driven in either the TELE or WIDE direction by the zoom driving mechanism, which comprises, for example, a zoom motor.

The movement of the zoom lens and the recording operation are alternately carried out. In other words, for example, movement of the zoom lens is suspended after being moved for a predetermined time. While the zoom lens is at rest, recording on the recording medium, shift of tracks from one to another, etc. are conducted. After completion of a series of recording operations, the movement of the zoom lens is resumed. The described operation is then repeated.

Accordingly, the movement of the zoom lens and the recording operation are not simultaneously executed and it is therefore possible to minimize the peak power consumption of the apparatus.

BRIEF DESCRIPTION OF THE DRAWINGS

The invention will be described below in detail with reference to the accompanying drawings, in which.

DESCRIPTION OF THE PREFERRED EMBODIMENTS

Figure 1:
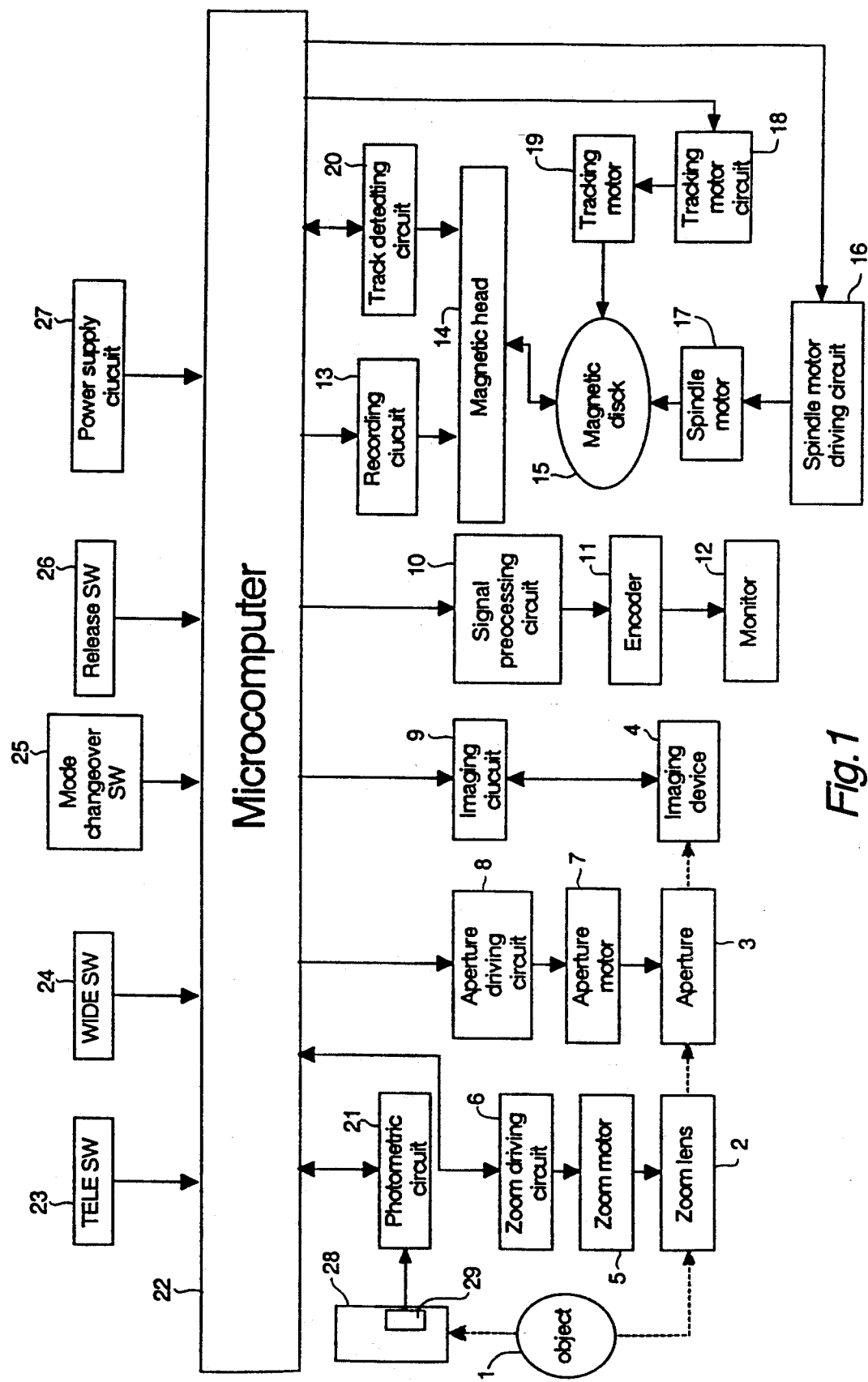
FIG. 1 is a block diagram showing an arrangement of one embodiment in which a zoom camera of the present invention is applied to an electronic still camera.

FIG. 1 is a block diagram showing the arrangement of one embodiment in which the zoom camera of the present invention is applied to an electronic still camera.

A zoom lens 2, through which light from an object passes, falls upon an imaging device 4 (such as a CCD,) after passing through an aperture 3 is provided.

The zoom lens 2 is driven by a zoom motor 5, which is driven by a zoom driving circuit 6. The aperture 3 is driven by an aperture motor 7, which is driven by an aperture driving circuit 8.

An imaging circuit 9 reads out an image signal from the imaging device 4 and transmits its output signal to a signal processing circuit 10. An encoder 11 encodes the output from the signal processing circuit 10 into an NTSC television signal, for example, and supplies it to a monitor (TV) 12.

A recording circuit 13 records a signal that is outputted from the signal processing circuit 10 onto a magnetic disk 15 through a magnetic head 14.

A spindle motor driving circuit 16 drives a spindle motor 17, which rotates the magnetic disk 15. A tracking motor driving circuit 18 drives a tracking motor 19, which moves the magnetic head 14.

A track detecting circuit 20 detects a level, such as a DPSK signal, control code signal, etc. from a reproduced signal that is outputted from the magnetic head 14, and outputs the detected information to a microcomputer 22, which serves as a control means.

A photometric circuit 21 measures light from the object 1 and outputs the result of the photometry to the microcomputer 22.

A TELE switch 23 and a WIDE switch 24 are operated to move the zoom lens 2 in the TELE direction and the WIDE direction, respectively. A mode change over switch 25 is operated to set various photographing modes. A release switch 26 is operated to effect a series of recording operations (e.g., photometry, exposure computation, aperture drive, imaging device exposure, reading, recording, track shift, etc.).

The release switch 26 comprises, for example, a two-stage switch which is arranged such that when the first-stage switch is turned ON, photometry, distance measurement and exposure computation are executed, and when the second-stage switch is turned ON, the following image recording operation is initiated.

A power supply circuit 27 has a battery therein to supply necessary electric power to the circuits, means, etc.

An optical finder 28, which is used to identify the object 1, has a light-receiving element 29 therein for photometry.

Figure 2:
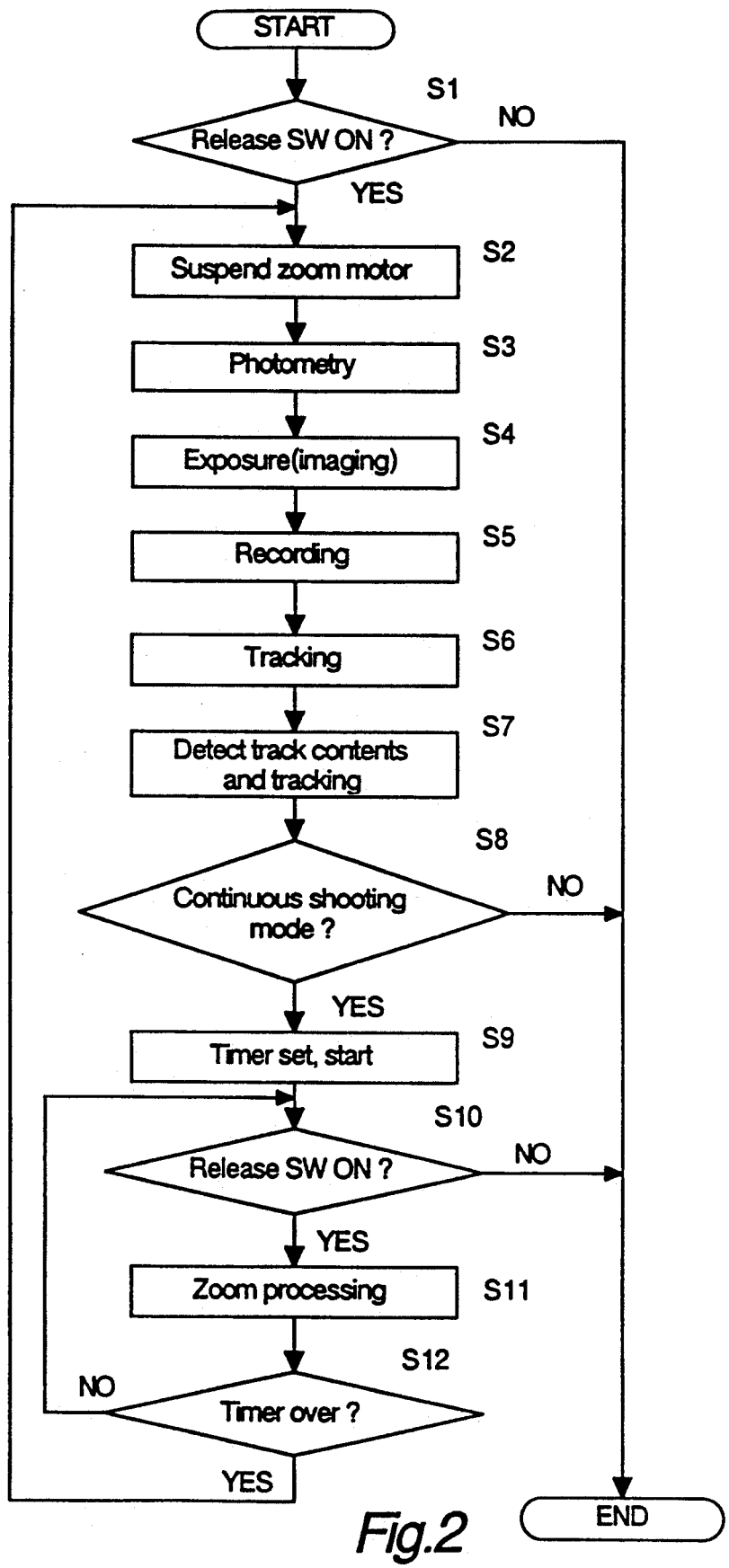
FIG. 2 is a flowchart showing a release process used in the embodiment shown in FIG. 1.
Figure 3:
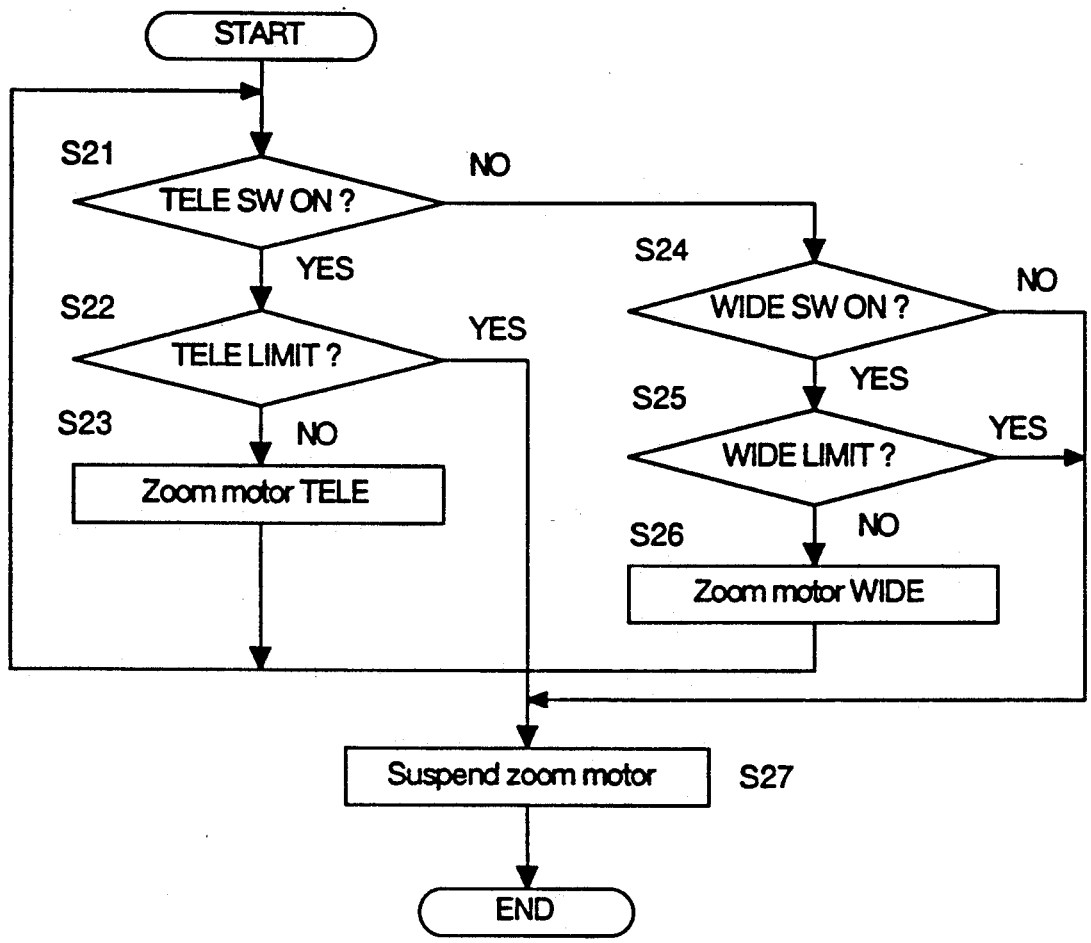
FIG. 3 is a flowchart showing more detailed processing steps in the zoom processing shown in FIG. 2.

The operation will next be explained with reference to flowcharts shown in FIGS. 2 and 3.

Light from the object 1 enters the imaging device 4 through the zoom lens 2 and the aperture 3. A signal that is produced in the imaging device 4 through photo-electric conversion is read out to the imaging circuit 9 and then inputted to the signal processing circuit 10. The signal processing circuit 10 processes the input signal into a signal which is conformable to the format of the electronic still camera.

When the monitor mode is set through the mode change over switch 25, the signal that is processed in the signal processing circuit 10 is inputted to the encoder 11, in which it is converted into a signal conformable to the NTSC format, for example, and the converted signal is then outputted to the monitor 12. In this way, object 1 can be monitored through the monitor 12.

Meantime, the photometric circuit 21 measures the light from the object 1 on the basis of the output from the light-receiving element 29 and outputs the result of the photometry to the microcomputer 22. The microcomputer 22 computes the signal that is inputted thereto from the photometric circuit 21 to determine a correct exposure quantity. The aperture driving circuit 8 drives the aperture motor 7 in accordance with the exposure quantity. Thus, the aperture 3 is moved to a position where a given exposure is obtained.

Accordingly, the display 12 always displays an image with a correct exposure.

In this way, object 1 is monitored through the monitor 12, and release switch 26 is turned ON at a given timing. Thus, the microcomputer 22 controls the zoom driving circuit 6 to suspend the zoom motor 5 (steps S1 and S2). Next, the microcomputer 22 computes an exposure quantity on the basis of the output from the photometric circuit 21 and controls the aperture driving circuit 8 in accordance with the result of the computation.

The aperture motor 7 is driven by the aperture driving circuit 8 to move aperture 3 to a position corresponding to the computed value (steps S3 and S4).

Meanwhile, a signal that is outputted from the imaging device 4 is inputted to the signal processing circuit 10 through the imaging circuit 9. The signal, which is converted into a signal conformable to the format of the electronic still camera in the signal processing circuit 10, is inputted to the recording circuit 13, where it is frequency-modulated. The signal is then supplied to the magnetic head 14. In the meantime, microcomputer 22 drives the spindle motor 17 through the spindle motor driving circuit 16 to rotate the magnetic disk 15 at a speed of 3,600 rpm. Accordingly, an image of one frame (one field) is recorded on a given track of the magnetic disk 15 (step S5).

Upon completion of this recording, microcomputer 22 drives the tracking motor 19 through the tracking motor driving circuit 18 to move the magnetic head 14 inwardly to the next track on the magnetic disk 15 (step S6). Then, a signal is reproduced from this track. The reproduced signal is inputted to the track detecting circuit 20 from the magnetic head 14. The track detecting circuit 20 detects and outputs a level of the reproduced signal to microcomputer 22.

Microcomputer 22 judges, from the signal that is inputted thereto from the track detecting circuit 20, whether another image signal has already been recorded on the track concerned. If another image signal has already been recorded on track, the magnetic head 14 is moved to a subsequent vacant track. In this way, it is checked whether image data is recordable on a track where the magnetic head 14 is placed (step S7).

After the completion of a series of recording operations, it is determined whether the continuous shooting mode is set. If the continuous shooting mode is not set through the mode changeover switch 25, the photographing operation is ended with the operations described above (step S8).

If the continuous shooting (photographing) mode is set, microcomputer 22 instructs its built-in timer to start a timing operation (step S8 and S9).

Even when the timer is performing a timing operation, if release switch 26 has already been turned OFF, the photographing operation is ended (step S10). If the release switch 26 is still ON, the zoom processing is executed (step S11).

More specifically, if the TELE switch 23 is ON and a TELE limit switch (not shown) is OFF microcomputer 22 drives the zoom motor 5 through the zoom driving circuit 6 to move the zoom lens 2 in the TELE direction (steps S21, S22 and S23).

If the TELE switch 23 is OFF, it is determined whether the WIDE switch 24 is ON (steps S21 and S24). If the WIDE switch 24 is ON and a WIDE limit switch (not shown) is OFF, the zoom lens 2 is moved in the WIDE direction (S25 and S26).

Whenever the zoom lens is moved, i.e., in the TELE direction or the WIDE direction, the drive of related the zoom motor 5 is suspended when the limit switch turns ON (steps S22, S25 and S27).

This zoom processing is carried out until the timer finishes counting a predetermined time, which has been set in advance. After the predetermined time has elapsed, the processing of step S2 and those following it are repeated (step S12).

More specifically, in this embodiment, when both the continuous shooting mode and the zooming mode are instructed to be executed, a series of recording operations, i.e., photometry, exposure, recording, tracking, and track content processing, is conducted while the zoom lens 2 is at rest.

After completion of these recording operations, the zoom lens 2 is moved again for a predetermined time. In this way, the movement of the zoom lens and the recording operation are alternately conducted.

It should be noted that the movement of the zoom lens and a series of recording operations are conducted at different times, as described above, not only when the continuous shooting mode and the zooming mode are combined together but also when another mode, e.g., the single AF mode, and the zooming mode are combined together.

Although the present invention has been described by way of an example in which it is applied to an electronic still camera, it should be noted that the present invention is also applicable to ordinary cameras which are designed to effect photographic recording on film. In such a case, the movement of the zoom lens and a recording operation, which includes the movement of a film that serves as a recording medium, are alternately conducted.

As has been described above, the zoom camera of the present invention is arranged such that the movement of the zoom lens and a series of recording operations are alternately conducted. It is therefore possible to minimize the peak power consumption of the apparatus. As a result, the power supply circuit can be reduced in terms of both the capacity and configuration, so that it is possible to reduce the overall size of the apparatus and make the camera compact for the carrying convenience. In addition, the manufacturing cost is also lowered.

I claim:

1. A zoom lens camera including a zoom lens, said camera comprising:
   recording means for recording an image on a recording medium;
   shutter release means for operating said recording means to record an image;
   zoom switch means for operating to drive said zoom lens, said zoom switch means being manually operable;
   zoom lens driving means for driving said zoom lens in response to the operation of said manually operable zoom switch means; and
   control means for controlling said zoom lens driving means and said recording means so that said zoom lens and said recording means are alternately activated upon operation of said zoom lens and operation of said recording means being simultaneously instructed, said control means being responsive to said shutter release means and said manually operable zoom switch means.

2. A zoom lens camera according to claim 1, wherein said zoom lens driving means comprises a zoom motor which drives said zoom lens.

3. A zoom lens camera according to claim 1, wherein said zoom switch comprises at least means a tele switch or a wide switch.

4. A zoom lens camera according to claim 3, wherein when at least either said tele switch or said wide switch is turned on during a recording operation, said zoom lens is driven in either a tele direction or a wide direction by said zoom lens driving means.

5. A zoom lens camera according to claim 1, further comprising a mode changeover switch means for selecting a continuous photographing mode.

6. A zoom lens camera according to claim 1, wherein said camera comprises a still video camera.

7. A zoom lens camera according to claim 1, wherein said recording medium comprises a magnetic disk.

8. The zoom lens camera according to claim 1, wherein said shutter release means and said zoom switch means are separately actuatable.

9. The zoom lens camera according to claim 1, said shutter release means comprising a manually operable shutter release switch.

10. A zoom lens camera including a zoom lens, said camera comprising:
    recording means for recording an image on a recording medium;
    shutter release means, having an ON position, for operating said recording means to record an image;
    zoom lens driving means for driving said zoom lens;
    zoom switch means, having an ON position, for operating said zoom lens driving means to drive said zoom lens;
    shutter release condition determining means for determining that said shutter release means is in said ON position;
    zoom switch condition determining means for determining that said zoom switch means is in said ON position; and
    control means for controlling said zoom lens driving means and said recording means, said control means being responsive to said shutter release condition determining means and said zoom switch condition determining means to suspend operation of said zoom lens driving means upon a determination that operation of said zoom lens and of said recording means are simultaneously instructed.

11. The zoom lens camera according to claim 10, said control means comprising timer means for enabling operation of said zoom driving means for a predetermined time.

12. The zoom lens camera according to claim 10, said camera further comprising a mode changeover switch.

13. The zoom lens camera according to claim 10, said zoom switch means comprising at least one manually operable switch.

14. The zoom lens camera according to claim 8, said zoom lens driving means comprising a zoom motor for driving said zoom lens.

15. The zoom lens camera according to claim 10, said zoom switch means comprising at least one of a tele-switch and a wide angle switch.

16. The zoom lens camera according to claim 10, said camera comprising a still video camera.

17. The zoom lens camera according to claim 10, said recording medium comprising a magnetic disk.

18. The zoom lens camera according to claim 10, said recording medium comprising a film.

19. The zoom lens camera according to claim 10, wherein said shutter release means and said zoom switch means are separately actuatable.

20. The zoom lens camera according to claim 10, said shutter release means comprising a manually operable shutter release switch.

* * * * *

UNITED STATES PATENT AND TRADEMARK OFFICE
CERTIFICATE OF CORRECTION

PATENT NO. : 5,276,563
DATED : January 4, 1994
INVENTOR(S) : K. OGAWA

It is certified that error appears in the above-indentified patent and that said Letters Patent is hereby corrected as shown below:

On the title page of the printed patent, section [56], under "U.S PATENT DOCUMENTS", add the following:

| Document Number | Date | Name |
|---|---|---|
| 4389098 | 6/83 | Fukushima |
| 4860113 | 8/89 | Miyamoto, et al. |
| 5006937 | 4/91 | Nonoshita, et al.---. |

On the cover of the printed patent, section [56], under "FOREIGN PATENT DOCUMENTS", add the following:

| Document Number | Date | Country |
|---|---|---|
| 3134916 | 8/82 | Germany |
| 3634148 | 4/87 | Germany |
| 3641592 | 6/87 | Germany---. |

At column 5, line 31 (claim 1, line 17) of the printed patent, change "simultaneously" to ---concurrently---.

At column 5, line 39 (claim 3, line 2) of the printed patent, change "zoom switch comprises at least means a tele switch" to ---zoom switch means comprises at least a tele switch---.

At column 6, line 27 (claim 10, line 24) of the printed patent, change "simultaneously" to ---concurrently---.

Signed and Sealed this

Thirteenth Day of September, 1994

Attest:

BRUCE LEHMAN

Attesting Officer

Commissioner of Patents and Trademarks